US006144169A

United States Patent [19]
Janczak

[11] Patent Number: 6,144,169

[45] Date of Patent: Nov. 7, 2000

[54] TRIAC DIMMABLE ELECTRONIC BALLAST WITH SINGLE STAGE FEEDBACK POWER FACTOR INVERTER

[75] Inventor: Jerzy Janczak, Woodhaven, N.Y.

[73] Assignee: Philips Electronics North America Corporation, New York, N.Y.

[21] Appl. No.: 09/222,404

[22] Filed: Dec. 29, 1998

[51] Int. Cl.$^{7}$ ..................................................... H05B 37/02

[52] U.S. Cl. .................... 315/224; 315/307; 315/DIG. 4; 315/DIG. 7

[58] Field of Search .................................... 315/291, 308, 315/209 R, DIG. 4, DIG. 5, DIG. 7, 224, 225, 226, 307; 363/110

[56] References Cited

U.S. PATENT DOCUMENTS

| | | | |
|---|---|---|---|
| 5,404,082 | 4/1995 | Hernandez et al. | 315/219 |
| 5,410,221 | 4/1995 | Mattas et al. | 315/307 |
| 5,742,134 | 4/1998 | Wacyk et al. | 315/307 |
| 5,757,143 | 5/1998 | Hernandez Martucci et al. | 315/247 |
| 5,982,159 | 11/1999 | Janczak et al. | 323/282 |
| 5,994,848 | 11/1999 | Janczak | 315/224 |

*Primary Examiner*—Don Wong
*Assistant Examiner*—Ephrem Alemu
*Attorney, Agent, or Firm*—Robert J. Kraus

[57] ABSTRACT

A triac dimmable electronic ballast having a single stage feedback power factor inverter is configured to isolate the resonant circuit current from a DC bias, or a DC transient caused by activations of the triac. The resonant circuit is driven by a high frequency inverter, and contains a feedback path to a DC storage element. Two DC blocking devices are provided, one between the resonant circuit and the inverter, and one between the resonant circuit and the DC storage element.

8 Claims, 5 Drawing Sheets

DC BLOCKING
FEEDBACK
AC
TRIAC
EMI FILTER
AC RECTIFIER
DC COUPLER/ HIGH FREQUENCY RECTIFIER
DC STORAGE
INVERTER
DC BLOCKING
RESONANT CIRCUIT
LOAD
10 12 14 16 18 20 22 24 26 28
DRIVER/ CONTROLLER
40

TRIAC DIMMABLE ELECTRONIC BALLAST WITH SINGLE STAGE FEEDBACK POWER FACTOR INVERTER

BACKGROUND

1. Technical Field

The present application relates generally to electronic ballasts and, in particular, a single stage feedback power factor inverter which prevents a direct current DC bias from being applied to the resonant circuit current in a triac dimmable electronic ballast.

2. Description of Related Art

Typically, a conventional electronic ballast is implemented using feedback connections from a high frequency resonant circuit to a node between an alternating current (AC) rectifier and an isolating diode through which current to a direct current (DC) energy storage capacitor flows. The stored DC energy is converted into a square wave voltage waveform by an inverter which is driven, for example, by a drive control circuit.

For example, U.S. Pat. No. 5,404,082 to Hernandez et al. entitled "High Frequency Inverter with Power-Line-Controlled Frequency Modulation" discloses a low-cost electronic ballast for use with fluorescent lamps which utilizes a single stage feedback inverter topology. As is understood by those skilled in the art, the inverter is typically implemented as a half-bridge inverter using a pair of switches, e.g., MosFets. During steady state operation, for example, it is desired that these switches operate in what is known in the art as "zero voltage switching," which is a term that refers to operating the switches in an inductive mode. In an inductive mode, the current flowing in the resonant inductor (choke) lags the voltage across the inverter (i.e, resulting in an inductive load). On the other hand, when the current flowing through resonant inductor leads in phase the voltage across the inverter, the inverter is said to be operating in a capacitive mode. When operating in a capacitive mode, the switching losses are significant and severe damage can occur to the switches as is understood by those skilled in the art.

Referring now to FIG. 1 a block diagram illustrates an embodiment of a conventional single stage feedback inverter topology of an electronic ballast utilizing triac dimming. The electronic ballast includes an alternating current source 10 (e.g., standard AC line voltage of 120 volt and a frequency of 60 hz) which provides input power for operating the ballast. A triac switch 12 provides phase angle dimming of the electronic ballast by cutting off a portion of the phase of the AC input line voltage (depending on its setting, the triac will fire at a frequency equal to twice the input AC voltage frequency). An electromagnetic interference (EMI) filter 14 filters high frequency signals and rf noise (e.g., harmonics) generated by the ballast, thereby preventing the conduction of such noise to the AC input source 10. An AC rectifier circuit 16 rectifies the input AC power to provide rectified DC power. The rectified DC power is coupled via a DC coupler 18 to a DC energy storage device 20. The DC energy storage device 20 maintains an DC voltage which is relatively higher than the peak of the rectified voltage output by the rectifier 16.

An inverter 22 converts the high voltage DC voltage stored in the DC storage device 20 to a high frequency voltage having a frequency which typically varies between about 20 and 75 Khz. The inverter 22 typically comprises two transistors forming a high frequency half-bridge inverter having an inverter output node. A DC blocking device 24 couples the high frequency output of the inverter 22 to a resonant circuit 26. As is understood by those skilled in the art, the resonant circuit 26, which typically includes at least one resonant inductor, resonant capacitor and feedback capacitor, is arranged to resonate at a frequency somewhat lower than the normal range of the high frequency voltage. The DC blocking device 24 is provided to prevent a DC bias component (e.g., the average of the high frequency square voltage waveform generated by inverter 22) from being applied to the resonant circuit 26 and saturating, e.g., the resonant choke. A load 28 (e.g. a fluorescent lamp) is magnetically coupled to the resonant circuit 26 via an output transformer (not shown). The DC blocking device 24 also prevents the DC component from being applied to the load 28 (which reduces the life of the lamps).

A feedback loop connects the resonant circuit 26 to a feedback node in the DC coupling device 18. During a portion of every high frequency cycle, current is drawn from the rectifier 16. In addition, during another portion of the high frequency cycle, charging current flows to the DC storage device 20. During the entire cycle of the input AC voltage, DC energy stored in DC storage device 20 is greater than the peak voltage of the rectified AC voltage from the rectifier 16.

Typically, at least one parameter (voltage or current) is sensed in the resonant circuit for providing suitable frequency modulation of the inverter 22 via a driver controller device 30. This sensed parameter may be used, for example, ensuring that the switches operate in zero voltage switching mode (inductive mode) so as to minimize switching losses.

As is understood by those skilled in the art, the inverter is typically implemented with a pair of Mosfets in a half-bridge inverter configuration. These Mosfet switches each have a parasitic capacitance $c_{ds}$ and parasitic resistance $r_{ds}$ between the drain and source. When a switch is turned off after having high voltage applied across its drain and source terminals, the parasitic capacitance is charged up to the voltage across the drain/source junction. When the switch is subsequently activated, the voltage across the parasitic capacitance $c_{ds}$ may be discharged through the parasitic resistance $r_{ds}$, of the drain/source junction. When the inverter is operating at the steady state frequency of about 45–50 Khz, this current discharge may cause substantial losses unless the parasitic capacitor $C_{ds}$ is discharged through the body diode (from the substrate to the drain) prior to the switch turning on. Accordingly, prior to turning on the switch, current should be applied to the switch in the direction opposite the direction of the flow of current which occurs upon activating the switch. In the electronic ballasts shown in FIG. 1, when the triac fires, the resulting input ballast voltage and current causes an imbalance on the steady state voltages on the DC blocking device 24 (which is typically a capacitor). This voltage imbalance prevents the parasitic capacitances of the inverter switches from being discharged through the body diode prior to being activated, and results in the parasitic capacitances being discharged via the parasitic resistance $r_{ds}$ through the drain/source junction when the switch is activated.

This is illustrated with reference to FIG. 3. In FIG. 3, waveform A represents the input ballast current that is generated when the triac fires, and waveform B represents the drain current of a Mosfet switch which is generated for a plurality of cycles of the high frequency waveform. The negative current spikes of the B waveform indicate "zero voltage switching" in which the negative current flowing through the body diode of the switch results in a discharge of the parasitic capacitance. As shown in FIG. 3, one problem associated with the conventional triac dimmable ballast circuit discussed above is that, when the triac fires, the negative discharging of the switch drain current (waveform B) is lost for several cycles of the high frequency signal. Consequently, for these cycles, switching losses could be extremely dangerous to the switches at such high voltages since the charge of the parasitic capacitance is discharged through the drain/source junction via the parasitic resistance $r_{ds}$, when the switch is activated.

Referring to FIG. 4*a*, a diagram illustrates a comparison between the inverter switching voltage and resonant inductor current waveforms in response to a step change of voltage provided by a triac in the conventional ballast circuit. As is shown, when a step change voltage is applied to the input, the resonant inductor current is shifted above the zero reference line, indicating a DC bias applied in the resonant current. This reason for this is related to the charging process of the DC blocking device 24 (capacitor). After the step up voltage is applied to the input (i.e, the triac fires), the DC blocking capacitor is charged by the input current through the feedback path, which creates a DC bias in the resonant inductor current, thereby causing the inverter to operate in a capacitive mode and preventing the discharge of the parasitic capacitance through the body diode of the switch.

SUMMARY

The present invention is directed to a single stage feedback power factor inverter configuration for use in a triac dimmable electronic ballast which prevents a DC bias from being applied to the resonant circuit current via a feedback path connecting the resonant circuit with the feedback node of the single stage power factor inverter.

In aspect of the present invention, a dimmable electronic ballast, comprises:

an input means for connecting to an AC power source;

a triac switch for phase angle dimming the input AC power;

a rectifier for full wave rectifying the AC power output from the triac to provide DC power;

a DC coupling circuit having a feedback node associated therewith;

a DC energy storage device, operatively connected to the full-wave rectifier via the DC coupling circuit, for storing DC power;

a half-bridge inverter circuit connected to the DC energy storage device for converting the stored DC power to high frequency power at an inverter frequency;

a first DC blocking device;

a resonance circuit, operatively connected to the half-bridge inverter via the first DC blocking device, for coupling the high frequency power to a load;

feedback connection means connecting the resonant circuit to the feedback node of the DC coupling circuit, for providing high frequency power to the energy storage device; and a second DC blocking device, operatively connected to the feedback connection means, for preventing DC signals from being applied to the resonant circuit through the feedback connection means.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
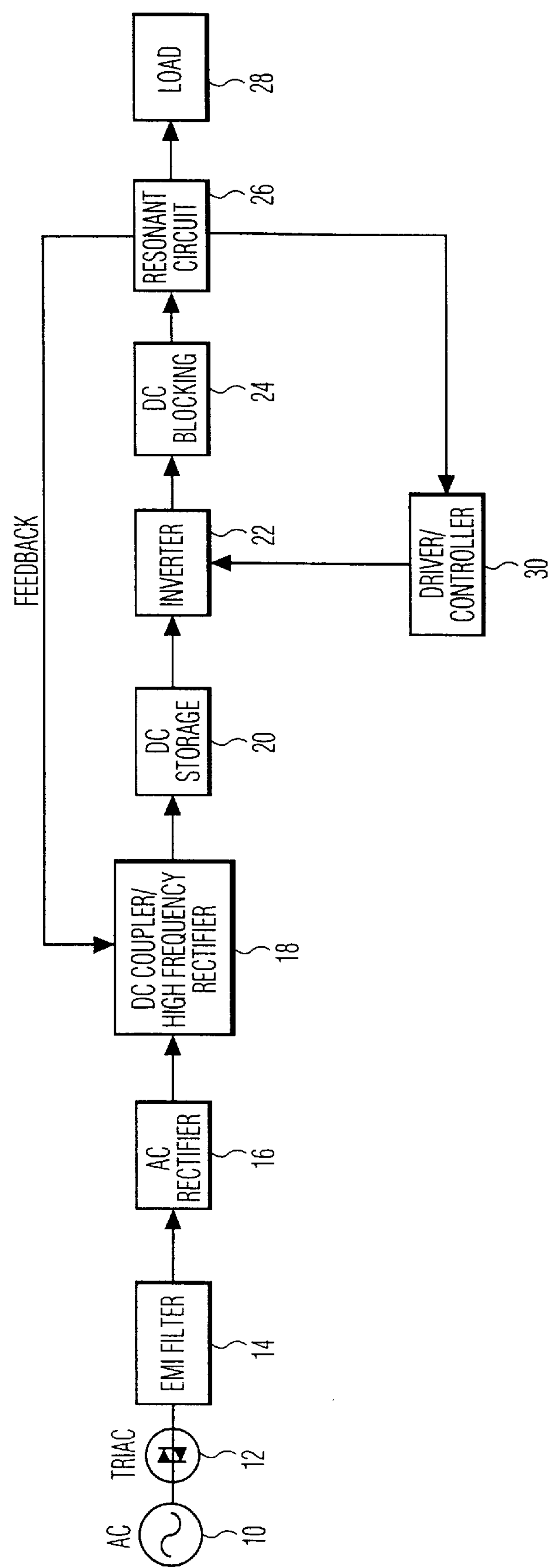
FIG. 1 is a block diagram of a single stage feedback power factor inverter in a triac dimmable electronic ballast in accordance with the prior art.
Figure 2A:
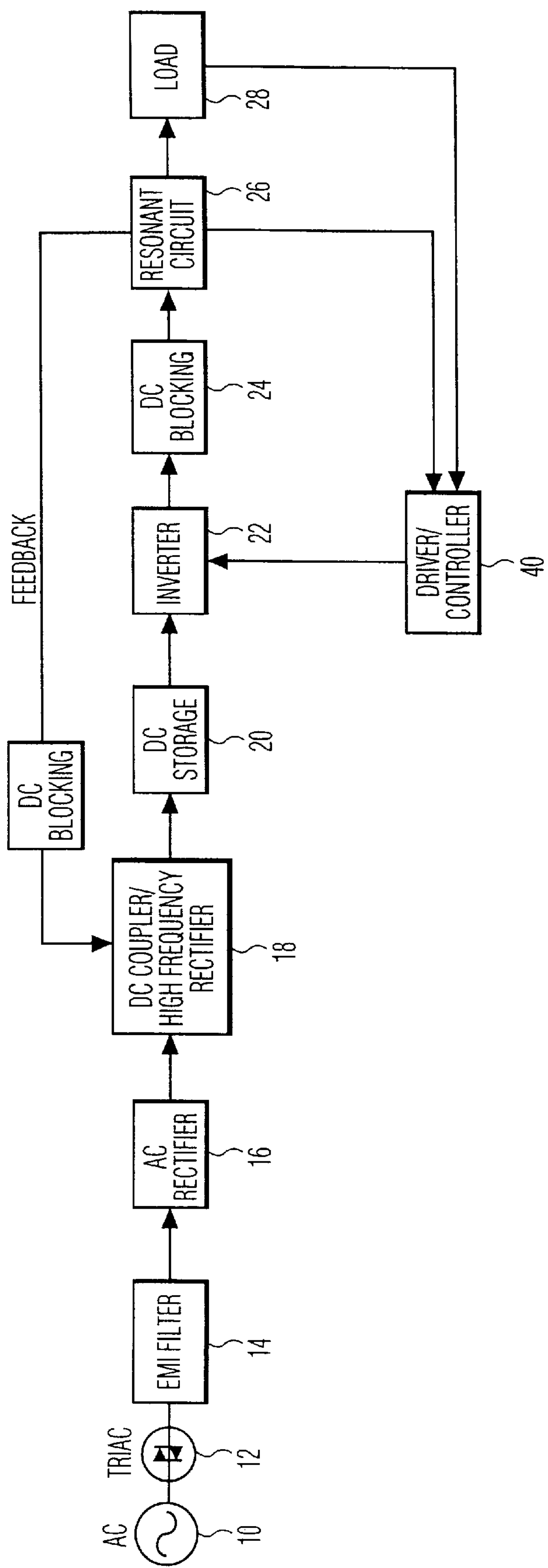
FIG. 2*a* is a block diagram of a single stage feedback power factor inverter in a triac dimmable electronic ballast in accordance with one embodiment of the present invention.

Referring now to FIG. 2*a*, a single stage feedback power factor inverter implemented in a triac dimmable electronic ballast in accordance with one embodiment of the present invention is shown. In accordance with the present invention, a second DC blocking device 32 is placed in the feedback path between the feedback node of the DC coupler/high frequency rectifier device 18 and the resonant circuit 26. The second DC blocking device 32 acts to separate the input signals generated by the activation of the triac 12 from the current flowing through the resonant circuit 26.

The second DC blocking device 32 eliminates the unbalances to the steady state voltages on the first DC blocking device 24 by isolating the resonant circuit between the first and second DC blocking devices 24 and 32, respectively.

Figure 2B:
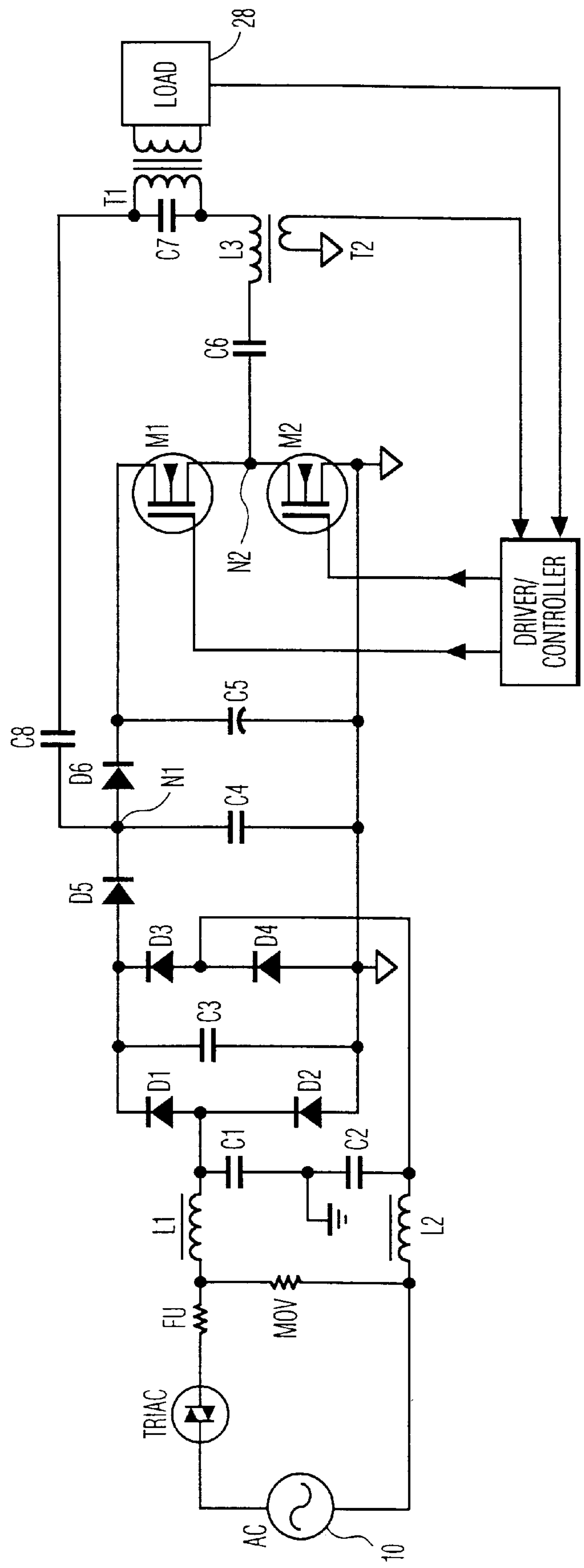
FIG. 2*b* is a circuit diagram of an embodiment of a single stage feedback power factor inverter of FIG. 2*a* implemented in a triac dimmable electronic ballast in accordance with the present invention.
Figures 3A, 3B:
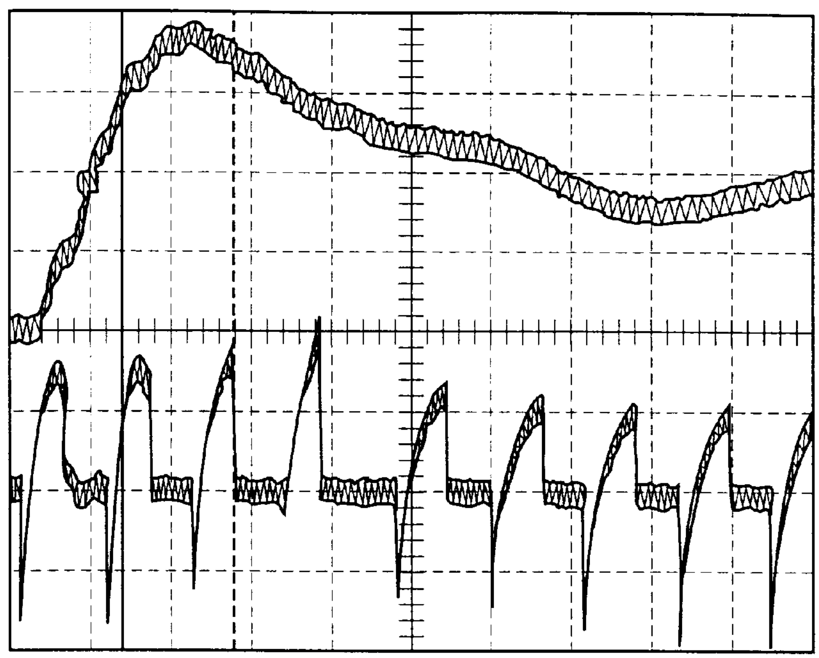
FIG. 3 is a diagram comparing input ballast current with drain current of a switch of an inverter in a triac dimmable single stage feedback inverter in accordance with the prior art.
Figure 4A:
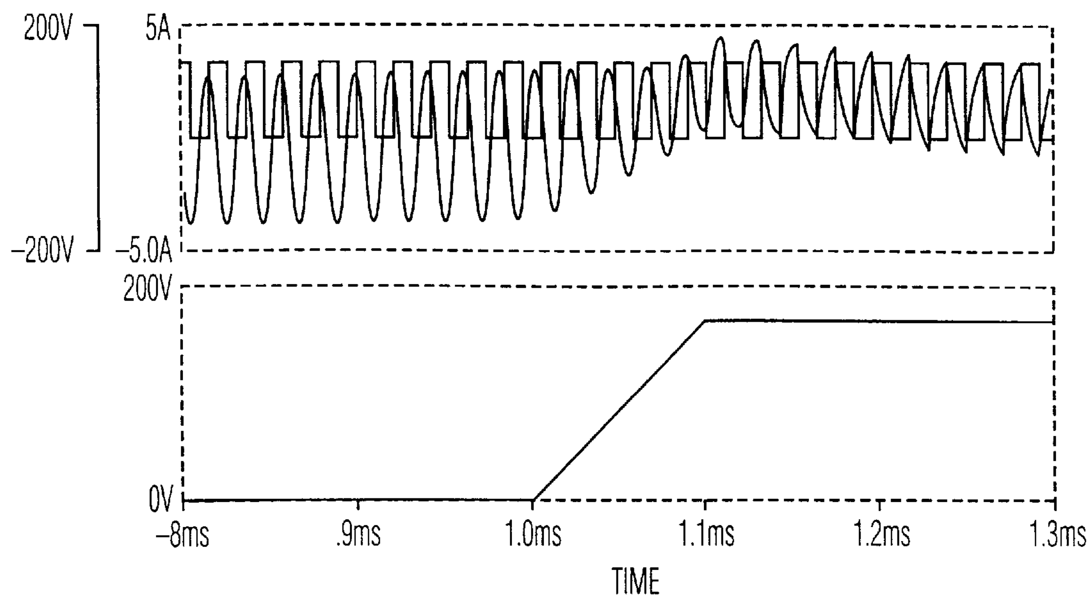
FIG. 4*a* is a illustrative diagram comparing inverter switching voltage and resonant inductor current waveforms in response to a step change of voltage provided by a triac in the conventional ballast circuit.
Figure 4B:
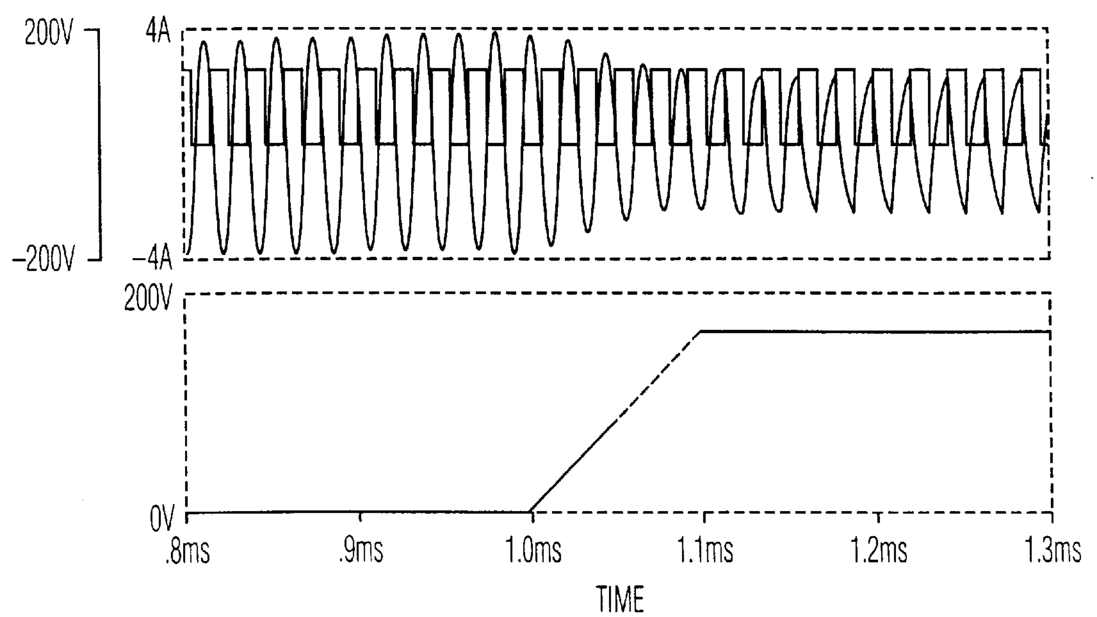
FIG. 4*b* is an illustrative diagram comparing inverter switching voltage and resonant inductor current waveforms that are generated in response to a step change of voltage provided by a triac in the ballast circuit having an additional DC blocking capacitor in accordance with the present invention.

Referring now to FIG. 2*b*, a circuit diagram illustrates an embodiment of a single stage feedback inverter in a triac dimmable electronic ballast in accordance with the present invention. The electronic ballast includes an alternating current source 10 which provides input power for operating the ballast. A triac switch 12 provides phase angle dimming as discussed above.

The electromagnetic interference (EMI) filter 14 includes chokes L1 and L2 and capacitors C1, C2 and C3. The AC rectifier comprises diodes D1, D2, D3 and D4. The DC coupler and high frequency rectifier includes diodes D5 and D6, respectively, which are connected via feedback node N1. The DC energy storage device is capacitor C5. The inverter is a half-bridge inverter formed by 20 Mosfets M1 and M2 having an inverter output node N2. The first DC blocking device is capacitor C6. The resonant circuit includes a resonant inductor L3, starting capacitor C7 and feedback capacitor C4. The feedback loop connects the resonant circuit to feedback node N1. The operation of the above described single stage feedback inverter circuit is well known in the art. A detailed discussion of its operation can be found, for example, in U.S. Pat. No. 5,404,082 to Hernandez et al. entitled "High Frequency Inverter With Power-Line-Controlled Frequency Modulation" and U.S. Pat. No. 5,410,221 to Mattas et al. entitled "Lamp Ballast With Frequency Modulated Lamp Frequency," the disclosures of which are incorporated herein by reference.

As illustrated, in accordance with the present invention, the second DC blocking capacitor C8 is connected between the feedback node N1 and the resonant choke L3. Advantageously, the resonant choke L3 is isolated (via blocking capacitor C8 and blocking capacitor C6) from DC transient signals which occur upon activation of the triac 12,during steady state operation of the ballast.

Preferably, a winding T2 is magnetically coupled to the resonant inductor L3 for sensing at least a portion of the current flowing through the resonant inductor L3. This sensed resonant inductor current may be provided to a driver/controller 40 for, inter alia, ensuring that the switches operate in zero voltage switching mode (inductive mode) so as to minimize switching losses. In addition, the driver/controller 40 may sense certain parameters of the load circuit 28 to provide power regulation. The driver/controller 40 may be implemented using the methods and hardware disclosed in U.S. Pat. No. 5,742,134 to Wacyk et al. entitled "Inverter Driving Scheme", the disclosure of which is incorporated herein by reference.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A dimmable electronic ballast, comprising:

an input means for connecting to an AC power source;

a triac switch for phase angle dimming the input AC power;

a rectifier for full wave rectifying the AC power output from the triac to provide DC power;

a DC coupling circuit having a feedback node associated therewith;

a DC energy storage device, operatively connected to the full-wave rectifier via the DC coupling circuit, for storing DC power;

a half-bridge inverter circuit connected to the DC energy storage device for converting the stored DC power to high frequency power at an inverter frequency;

a first DC blocking device;

a resonance circuit, operatively connected to the half-bridge inverter via the first DC blocking device; for coupling the high frequency power to a load;

feedback connection means connecting the resonant circuit to the feedback node of the DC coupling circuit, for providing high frequency power to the energy storage device; and a second DC blocking device, operatively connected to the feedback connection means, for preventing DC signals from being applied to the resonant circuit through the feedback connection means.

2. The dimmable electronic ballast of claim 1, wherein the first DC blocking device is a capacitor.

3. The dimmable electronic ballast of claim 1, wherein the second DC blocking device is a capacitor.

4. The dimmable electronic ballast of claim 1, wherein the DC storage device is a capacitor.

5. The dimmable electronic ballast of claim 1, wherein the resonant circuit includes a resonant inductor and resonant capacitor connected to the feedback connection means and a feedback capacitor connected between the feedback node and ground.

6. The dimmable electronic ballast of claim 1, wherein the resonant inductor is connected between the first DC blocking device and the second DC blocking device.

7. In a triac dimmable electronic ballast comprising a single stage feedback power factor inverter including an input power stage, a resonant circuit and a feedback path connecting the resonant circuit to a feedback node in the power stage, the input power stage being connected to the resonant circuit via a first DC blocking device, the improvement comprising:

a DC blocking device, operatively connected in the feedback path between the resonant circuit and the feedback node, to prevent DC power from being applied to the power in the resonant circuit.

8. The triac dimmable electronic ballast of claim 7, wherein the second DC blocking device is a capacitor.

* * * * *